(12) United States Patent
Langman et al.

(10) Patent No.: US 8,276,131 B2
(45) Date of Patent: Sep. 25, 2012

(54) METHOD AND SYSTEM FOR DYNAMIC LOOP TRANSFER BY POPULATING SPLIT VARIABLES

(75) Inventors: Kevin J. Langman, Maple (CA); Zhong L. Wang, Markham (CA)

(73) Assignee: International Business Machines Corporation, Armonk, NY (US)

( * ) Notice: Subject to any disclaimer, the term of this patent is extended or adjusted under 35 U.S.C. 154(b) by 1426 days.

(21) Appl. No.: 11/847,451

(22) Filed: Aug. 30, 2007

(65) Prior Publication Data

US 2009/0064113 A1 Mar. 5, 2009

(51) Int. Cl.
*G06F 9/45* (2006.01)
(52) U.S. Cl. ........................ 717/148; 717/140
(58) Field of Classification Search .................. 717/148
See application file for complete search history.

(56) References Cited

U.S. PATENT DOCUMENTS

| | | | | |
|---|---|---|---|---|
| 6,223,340 | B1 * | 4/2001 | Detlefs | 717/145 |
| 7,665,079 | B1 * | 2/2010 | Yasue et al. | 717/160 |
| 7,895,582 | B2 * | 2/2011 | Duffy et al. | 717/140 |
| 2004/0003380 | A1 * | 1/2004 | Fedorov | 717/148 |

OTHER PUBLICATIONS

Qian, Feng (2005). Runtime techniques and interprocedural analysis in Java virtual machines. Ph.D. dissertation, McGill University (Canada), Canada. Retrieved Apr. 28, 2012, from Dissertations & Theses: Full Text.(Publication No. AAT NR12931).*
Stoodley et al. "Real-time Java, Part 2: Comparing compilation techniques" Apr. 17, 2007, IBM DeveloperWorks, accessed from http://www.ibm.com/developerworks/java/library/j-rtj2/ on May 1, 2012.*

* cited by examiner

*Primary Examiner* — James D Rutten
(74) *Attorney, Agent, or Firm* — Cantor Colburn LLP; Libby Toub (57) ABSTRACT

A method that provides for dynamic loop transfer for a method having a first set of instructions being executed by an interpreter is provided. An execution stack includes slots for storing a value of each local variable known to each subroutine while the subroutine is active. The method comprises suspending execution at a point for which a current execution state can be captured from the execution stack; assigning the value in each slot of the execution stack to a corresponding slot of an array of values; scanning the first set of instructions to identify a data type for local variable that is not known in the current execution state and shares a slot in the execution stack with a local variable that is known; and generating a second set of instructions for the method coded to be initially executed to declare each local variable that is known in the current execution state and each local variable for which a data type was identified, assign each declared variable with the value assigned to the slot in the array that corresponds to the slot of the execution stack in which the value of the variable is stored during execution of the first set of instructions, and branch to a target point in the second set of instructions that corresponds to the point at which execution was suspended.

11 Claims, 6 Drawing Sheets

```
public void test_transfer(Object arg1, int arg2)
{
    int a;
    Object b;

arg1 = glb_array[0];
    arg2 = glb_array[1];
    a = glb_array[2];
    b = glb_array[3];

/* IL has goto statement
       goto inserted_Label;

/* Interpreted already */
    Already_done();

/* Transfer in to compiled code at this point */
    inserted_Label;
    Control_is_right_at_this_point();

Much_more_to_be_done();
}
```

Figure 6b

```
public void test(Object arg1, int arg2)
{
    int a;
    Object b;

/* Interpreted already */
    Already_done();

/* Transfer in to compiled code at this point */
    Control_is_right_at_this_point();

Much_more_to_be_done();
}
```

Figure 6a

```
public void alternate_test(Object arg1, int arg2)

int a;
    Object b;
{
    int c;

/* Interpreted already */
    Already_done();

/* Transfer in to compiled code at this point */
    Control_is_right_at_this_point();
}
{
    float d;
    Much_more_to_be_done();
}
}
```

Figure 7a

```
public void alternate_test_transfer(Object arg1, int arg2)
{
    int a;
    int c;
    float d;
    Object b;

arg1 = glb_array[0];
    arg2 = glb_array[1];
    a = glb_array[2];
    b = glb_array[3];

c = glb_array[4];
    d = glb_array[4];

/* IL has goto statement */
    goto inserted_Label;

{
        /* Interpreted already */
        Already_done();
    }

/* Transfer in to compiled code at this point */
    inserted_Label;
    Control_is_right_at_this_point();

{
        Much_more_to_be_done();
    }
}
```

Figure 7b

METHOD AND SYSTEM FOR DYNAMIC LOOP TRANSFER BY POPULATING SPLIT VARIABLES

BACKGROUND OF THE INVENTION

1. Field of the Invention

This invention relates to compilation of computer programs, and more particularly, to dynamic loop transfer in dynamic compilation environments.

2. Description of Background

The instructions that a processor within a computer system executes are ultimately determined by a programmer, but typically, the programmer will write higher-level-language "source code" that computer programs use to generate machine-level instructions that are actually evaluated during execution. A compiler is a computer program module that translates source code into object code, which is written in a lower-level computer language that has a form suitable for processing by a target platform. Different hardware platforms are configured to process different native code forms and therefore require different compilers. A typical compiler may perform operations such as lexical analysis, preprocessing, parsing, semantic analysis, code generation, and code optimization. Code optimization is the process of tuning the object code output to minimize some attribute (or maximize the efficiency) of the executable program.

Static compilers perform compilation by converting source code to machine code that can be directly executed on the target platform. To gain performance during program execution, some programming language implementations can utilize dynamic compilers instead. Dynamic compilation entails the generation of code at runtime; that is, program code is dynamically constructed during execution of the program while other code in the same system is being evaluated. This can allow for optimizations to be made that can only be known at runtime.

Advanced implementations of modern object-oriented languages, such as Java, depend on runtime environments that employ "just-in-time" (JIT) compilation for performance. These language environments dynamically compile program code that is loaded incrementally, possibly from a remote target. While programs are running, JIT compilers selectively compile the most frequently executing methods to native code, which is code that is intended to directly run on the same type of computer and operating system upon which the compiler itself is running. JIT compilers compile separate code sequences one at a time, as they execute or "on the fly", into equivalent sequences of the native code of the underlying machine, to improve the runtime performance. A JIT compiler may only compiles a code path when it knows the code path is about to be executed. This approach allows the program to start up more quickly, as a lengthy compilation phase is not needed before any execution can begin.

Because overall program execution time will include compilation overhead when using a JIT compiler, it is important for the JIT compiler to be fast and lightweight, as well as to generate high-quality native code. One particular concern is that, while dynamic and on-the-fly compilation techniques such as JIT compilation have the potential to significantly improve program performance, optimization implementation can be challenging because some optimizations that could be done at the initial compile time are delayed until further compilation at runtime. This can force the compiler to predict which optimizations will be most successful for the remainder of program execution.

One approach to enable more aggressive optimizations for JIT-based virtual machines is to specialize the program for a particular behavior or set of execution conditions and then to undo the optimization when conditions change. This enables the compiler to identify optimizations that are likely to be successful in the near-term, and then apply others as it learns more about future program and resource behavior. Examples of such optimizations include virtual call inlining, exception handler removal, and memory management system optimizations.

The presence of an efficient, general-purpose mechanism for undoing optimization on-the-fly when associated assumptions are rendered invalid is important to ensure that future method invocations can be handled by recompilation. The process performed by such a mechanism, which allows execution control to change midway through from the mode of evaluating the currently executing method to the mode of compiling a replacement version of the method and then reinitiating execution of the new version in native code, is termed dynamic loop transfer or on-stack replacement. Dynamic loop transfer can be used to enable enhancements such as debugging optimized code via de-optimization, deferred compilation to improve compiler speed and/or code quality, online optimization of activations containing long-running loops, and optimization and code generation based on speculative program invariants.

One example of a dynamic loop transfer implementation is that provided by Sovereign, a JIT compiler developed by IBM for the AIX operating system platform. Sovereign performs dynamic loop transfer by carefully arranging the compiled code of the targeted method into a multiple-entry method body. This is done so that the previously compiled method can be used for new calls to the method while still separately allowing the method's particular execution state at the time of extraction to be mapped into a stack activation frame to allow the recompiled counterpart to be used for continuing execution where interpretation left off.

A drawback to the Sovereign approach is that it is error prone. Arrangement of the compiled code into the method body must be carefully performed for each targeted method because the execution state at the dynamic entry point in the recompiled method needs to match the execution state at the time of extraction. There are many JIT optimization processes need to be able to properly take into account the expected replacement entry point to avoid making changes to the method body that would prevent the transfer to the correct entry point in the recompiled method. This requires that the execution state be mapped into a new activation frame that is arranged to match the expected transfer entry point of the recompiled method. The occurrence of multiple entry points can lead some optimizations to loop endlessly because dataflow algorithms fail to converge. Furthermore, the Sovereign approach operates to disable many code optimizations and therefore can degrade performance by generating code that is less optimal then normal.

SUMMARY OF THE INVENTION

The shortcomings of the prior art can be overcome and additional advantages can be provided through exemplary embodiments of the present invention that are related to a method for providing dynamic loop transfer within a dynamic compilation environment for a method having a first set of instructions being executed by an interpreter. The method has an execution stack that includes slots for storing a value of each local variable known to each subroutine of the method while the subroutine is active during execution by the interpreter. The method comprises suspending execution of the method by the interpreter at a point for which a current execution state of the method can be captured from the execution stack; assigning the value in each slot of the execution stack in the current execution state to a corresponding slot of an array of values; scanning the first set of instructions to identify a data type for each local variable of the method that is not known in the current execution state and shares a slot in the execution stack with a local variable that is known; and generating a second set of instructions for the method, the second set of instructions being coded to be initially executed to declare each local variable that is known in the current execution state and each local variable for which a data type was identified while scanning the first set of instructions, assign each declared variable with the value assigned to the slot in the array of values that corresponds to the slot of the execution stack in which the value of the variable is stored during execution of the first set of instructions by the interpreter, and branch to a target point in the second set of instructions that corresponds to the point in the first set of instructions at which execution was suspended.

The shortcomings of the prior art can also be overcome and additional advantages can also be provided through exemplary embodiments of the present invention that are related to computer program products and data processing systems corresponding to the above-summarized method, which are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

Technical Effects

As a result of the summarized invention, technically we have achieved a solution that can be implemented to perform dynamic loop transfer within a dynamic compilation environment in a manner that is less error prone, can rely on the logical operations performed by the dynamic compiler during compilation, can lead to the generation of better performing code, and can provide for additional flexibility in compilation.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description of exemplary embodiments of the present invention taken in conjunction with the accompanying drawings in which:

FIG. 6b illustrates an exemplary replacement pseudo-source code method that may result when performing the exemplary dynamic loop transfer process of FIG. 5 on the exemplary pseudo-source code method of FIG. 6a.

FIG. 7b illustrates a second exemplary replacement pseudo-source code method that may result when performing the exemplary dynamic loop transfer process of FIG. 5 on the second exemplary pseudo-source code method of FIG. 7a.

The detailed description explains exemplary embodiments of the present invention, together with advantages and features, by way of example with reference to the drawings. The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

DETAILED DESCRIPTION OF EXEMPLARY EMBODIMENTS

While the specification concludes with claims defining the features of the invention that are regarded as novel, it is believed that the invention will be better understood from a consideration of the description of exemplary embodiments in conjunction with the drawings. It is of course to be understood that the embodiments described herein are merely exemplary of the invention, which can be embodied in various forms. Therefore, specific structural and functional details disclosed in relation to the exemplary embodiments described herein are not to be interpreted as limiting, but merely as a representative basis for teaching one skilled in the art to variously employ the present invention in virtually any appropriate form. Further, the terms and phrases used herein are not intended to be limiting but rather to provide an understandable description of the invention.

Figure 1:
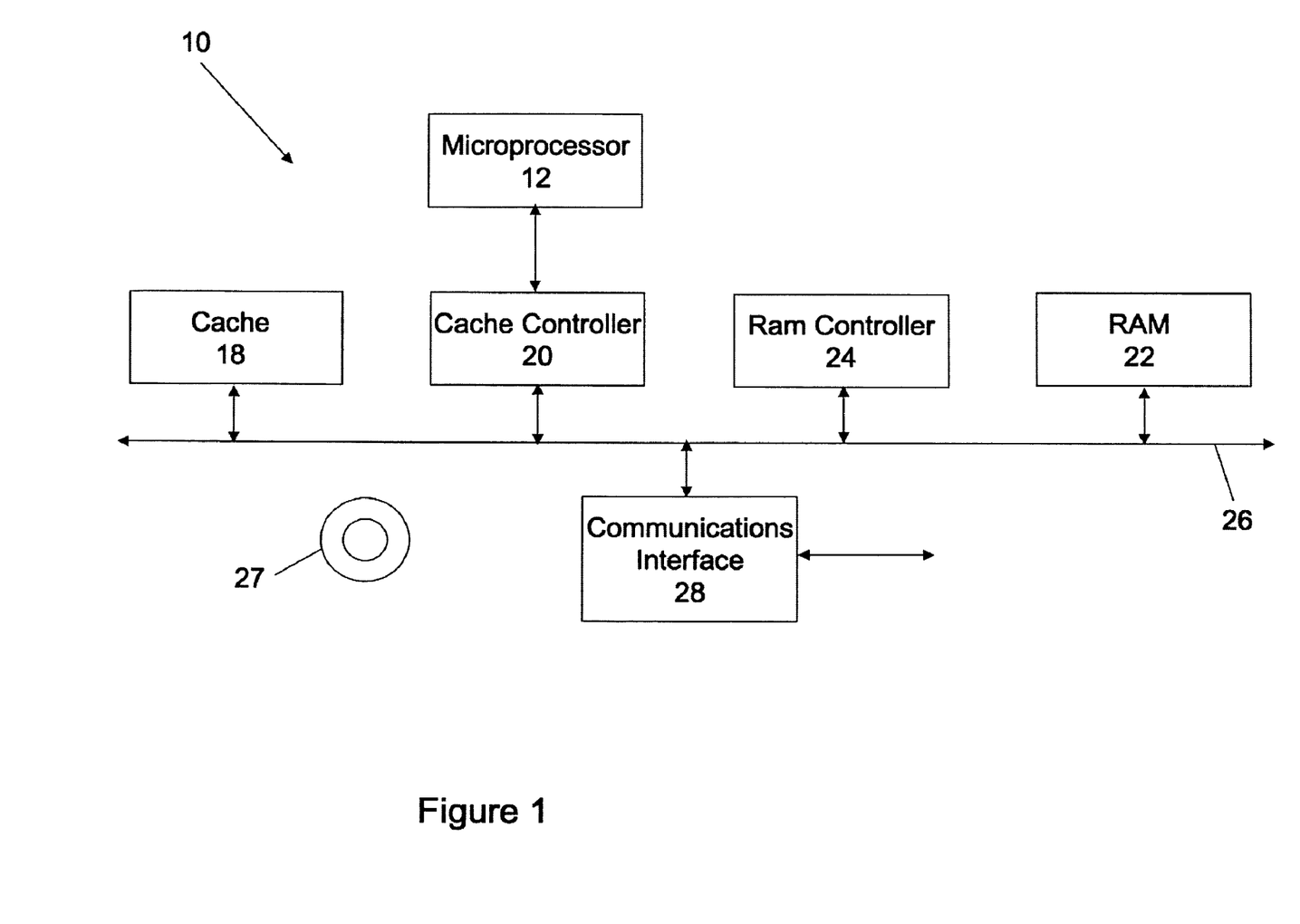
FIG. 1 is a block diagram illustrating an exemplary computer system upon which exemplary embodiments of the present invention may be implemented.

Turning now to the drawings in greater detail, it will be seen that FIG. 1 illustrates an exemplary computer system 10 upon which exemplary embodiments of the present invention can be implemented. A processor or CPU 12 receives data and instructions for operating upon from on-board cache memory or further cache memory 18, possibly through the mediation of a cache controller 20, which can in turn receives such data from system read/write memory ("RAM") 22 through a RAM controller 24, or from various peripheral devices through a system bus 26. The data and instruction contents of RAM 22 will ordinarily have been loaded from peripheral devices such as a system disk 27. Alternative sources include communications interface 28, which can receive instructions and data from other computer systems.

The instructions that microprocessor 12 executes are machine-level instructions, may have been compiled from source code written in a higher-level language by a programmer. In exemplary embodiments, the source code need not have been written by a human programmer directly. For example, integrated development environments may automate the source-code-writing process to the extent that, for many applications, very little of the source code is produced "manually."

Figures 2, 3:
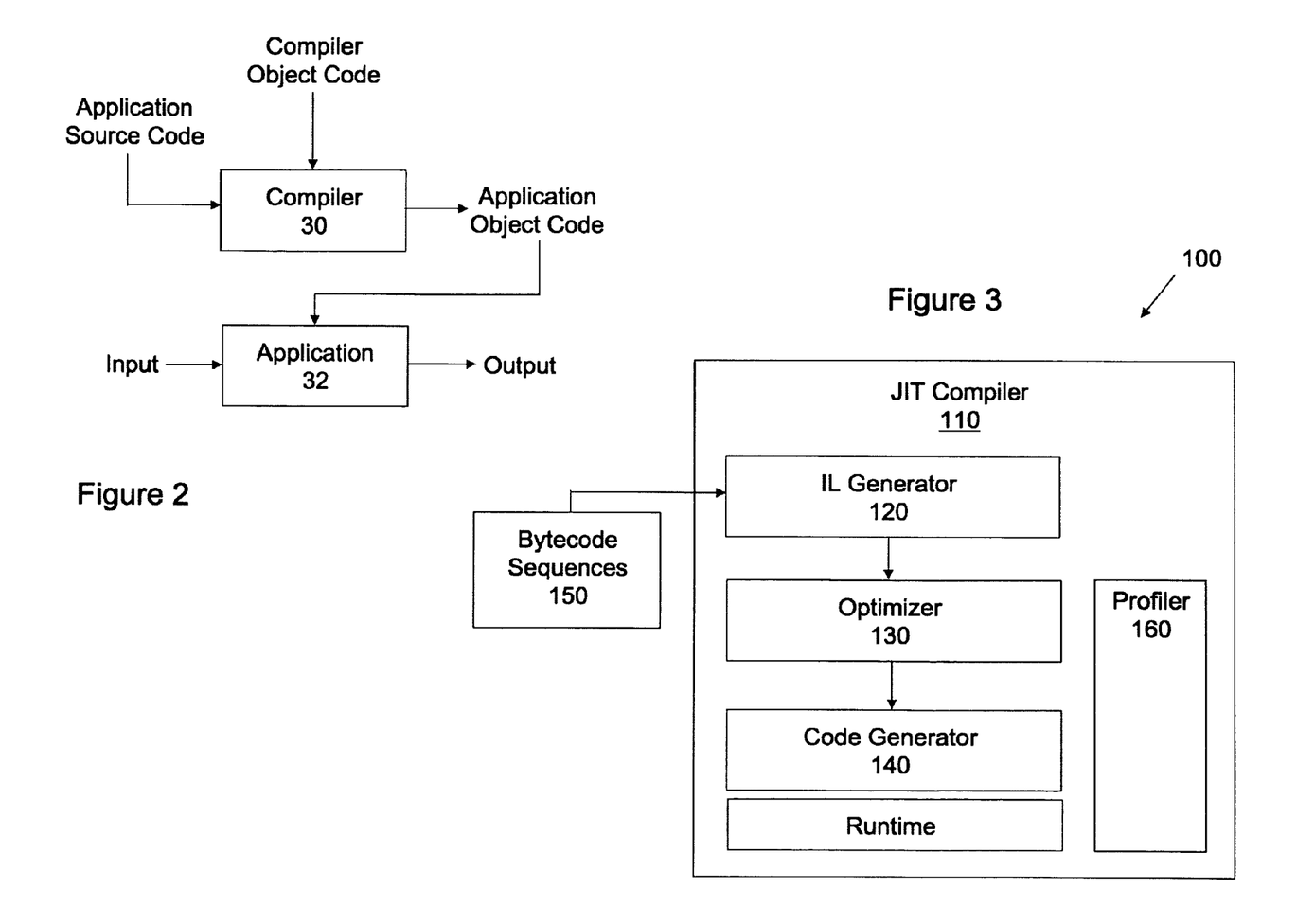
FIG. 2 is an illustration of an exemplary embodiment of a general compilation sequence.
FIG. 3 is a block diagram illustrating an exemplary embodiment of a JIT compiler structure.

FIG. 2 is an illustration of an exemplary embodiment of a general compilation sequence. Block 30 represents a compiler process that computer system 10 performs under the direction of compiler object code, which can be stored on system disk 27 or some other machine-readable medium and can be loaded into system memory 24 by transmission of electrical signals to configure computer system 10 to act as a compiler. In other exemplary embodiments, the compiler object code may alternatively be stored within a server system that is remote from the machine that performs the compiling.

Compiler process 30 operates to convert source code into further object code, which it places in machine-readable storage such as RAM 24 or disk 27. A computer will follow that object code's instructions in performing an application 32 that may, for example, generate output from input. Compiler process 30 is itself also an application in which the input is source code and the output is object code.

It should be noted that the term compiler is used broadly in the discussion that follows and can extend to conversions of low-level source code, such as virtual machine instructions that are typically not written by programmers, to object code. In exemplary embodiments, compiler process 30 can be configured to first translate the source code into an intermediate language having a form more suitable for code-improving transformations as an intermediate step before generating object code for a target machine. For instance, the intermediate language can be a form of bytecode, which is a binary representation of an executable program designed to be executed by a virtual machine rather than by dedicated hardware. After source code is compiled to bytecode, the resulting output may be used as the input of a compiler targeting machine code or executed directly on a virtual machine. In exemplary embodiments, the computer that executes application 32 is not necessarily the same as the one that performs the compiler process.

Although FIG. 2 may appear to suggest a batch process for the compilation sequence in which all of the object code of application 32 is produced before any of it is executed, the system may be configured so that the same processor both compiles and executes the code, in which case the processor may execute compiler process 30 concurrently with and in a way that may be dependent upon its execution of the object code output by the compiler. In exemplary embodiments, the general compilation sequence illustrated in FIG. 2 may be performed within a dynamic compilation environment in which compiler process 30 is concurrently used during execution of application 32.

In an exemplary dynamic-compilation environment, not all of the compilation is completed before execution of some of the resultant object code begins. For example, the compilation process may be "lazy" in the sense that it may compile only a main procedure without initially compiling any of the procedures that the main procedure can call. In place of the calls to those procedures, for instance, the compiler may initially provide stubs that determine whether the source code of the callee procedures should be compiled or interpreted, in which case a callee procedure is not compiled unless execution of the object code reaches such a stub.

An exemplary dynamic compilation environment is that of a Java Virtual Machine (JVM) that employs a "just-in-time" (JIT) compiler. A JVM machine is an abstract machine designed to support the Java programming language, but it does not interact with the source language directly. In such an environment, source programs written in the Java programming language are first converted into an architecture-neutral distribution format, called Java bytecode, and the sequences of bytecodes are "virtual machine instructions" that describe the operations that each method in a Java class performs in a JVM. A bytecode program can be executed before it is compiled to machine code using, for example, a stack-based bytecode interpreter that parses the instructions one at a time.

The execution engine for Java programs includes a JVM that implements the Java platform for a particular native platform. For example, the Linux®-based Intel® x86 platform, the Sun Solaris platform, and the IBM System p™ platform running on the AIX® operating system each has a JRE. JRE implementations provide the native support for interpreting or executing a program as a sequence of bytecodes. The JVM implementation is architecture dependent and, in different exemplary embodiments, may be a piece of software that may be written in Java or another programming language other than Java, or implemented as a hardware CPU.

An exemplary embodiment of a JIT compiler structure (also called a dynamic translator) is illustrated in FIG. 3. In JIT compiler structure 100, a JIT compiler 110 operates to dynamically compile bytecode sequences 150 of an input Java program by compiling each given bytecode sequence as necessary at runtime ("on the fly") into equivalent sequences of the native code of the underlying machine, to improve the runtime performance. JIT compiler 110 includes an intermediate language (IL) representation generator 120 that generates an internal representation of each bytecode sequence. An IL representation is different from bytecode but still at a higher level than the target processor's native instructions. For example, the IBM JIT compiler uses a sequence of expression trees to represent the method's operations. JIT compiler 110 also includes an optimizer module 130 that performs a sequence of optimizations to improve quality and efficiency and a code-generator 140 to translate the optimized internal representation to the target processor's native instructions. The generated code relies on a runtime environment to perform activities such as ensuring a type cast is legal or allocating certain types of objects that are impractical to perform directly in the code itself.

JIT compiler 110 operates on a Java bytecode thread that is separate from the application threads so that the application can execute while compilation is occurring. A bytecode thread is similar to an application thread—execution is sequential, but multiple threads can execute in parallel, and each thread has its own program counter and execution stack. The execution stack stores information about the active subroutines of a computer program, such as the return address, parameters, and local variables, in a stack frame, and there is typically one execution stack associated with a program while it is running. Each stack frame in an execution stack corresponds to a call to a subroutine which has not yet terminated with a return. The amount of space needed for local variables will be different for different subroutines.

The exemplary JIT compiler structure illustrated in FIG. 3 also includes a profiler 160 that observes the executing program's behavior and conditions by periodically sampling the threads to find frequently executing methods. Profiler 160 can also provide facilities for specialized profiling of method versions to collect information about how the program is behaving and to store dynamic values that might not change in a current execution of the program.

Figure 4:
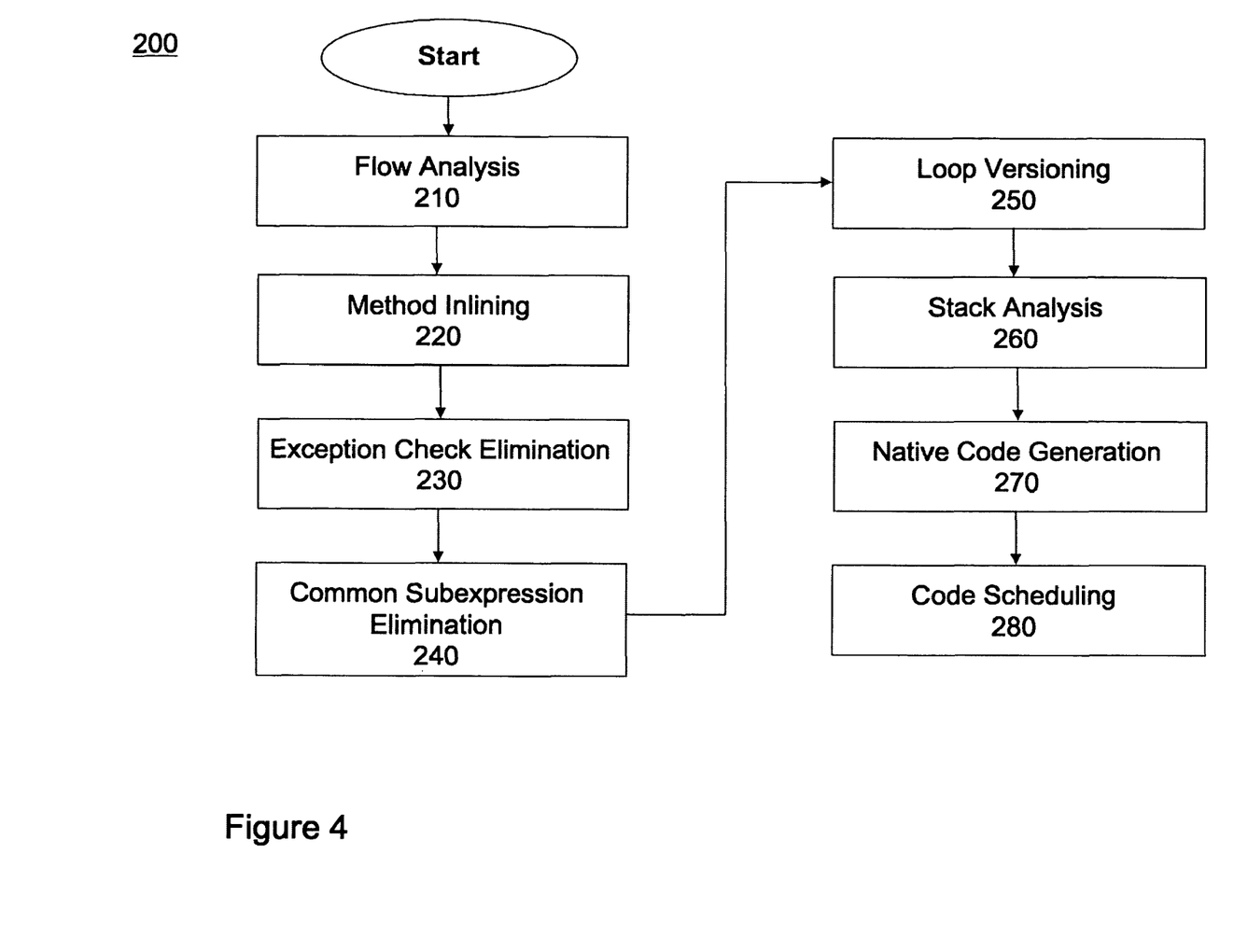
FIG. 4 is a flow diagram illustrating an exemplary embodiment of a compilation process performed by an exemplary JIT compiler.

FIG. 4 illustrates an overall flow diagram for an exemplary embodiment of a compilation process 200 performed by a JIT compiler structure. First, in the flow analysis phase at step 210, the basic blocks and the loop structures are generated by performing a linear-time traversal of the given bytecode sequences. The given bytecode sequence is then converted to the internal, IL representation in which, for example, some new opcodes are introduced to represent operations that result from the optimizations.

The IL representation, which retains stack semantics in the manner of the original bytecode, is generated as the internal representation at step 210 to avoid the conversion cost in the compilation process. The IL provides an instruction form more suitable for code-improving transformations or optimizations as an intermediate step before generation of native code for execution by the targeted machine.

After the process generates the IL representation, the optimization phase then starts, and several techniques are applied to this internal representation: method inlining at step 220, exception check elimination at step 230, common subexpression elimination at step 240, and loop versioning at step 250. Optimizations based on dataflow analysis, such as constant propagation and dead code elimination, can also be applied to the IL representation.

At step 260, stack analysis is performed in which the variables in stack computation are separately mapped to each of the logical registers for integer and floating-point calculation by traversing bytecode stack operations. The region for register allocation of local variables is also defined, and the number of accesses of local variables in each region is counted.

Finally, at step 270, native code is generated on the basis of the optimized sequences of IL code by allocating physical registers for each stack and local variable. To reduce the compilation time, there is no independent single pass for the register allocation; that is, the register allocation runs synchronously with the code generation. Simple code scheduling within a basic block is then applied at step 280 to reorder the instructions so that they best fit the requirements of the underlying machine. The JIT compiler can identify the type of machine it is running on and make use of this information in both code generation and code scheduling.

In exemplary embodiments, a virtual machine environment such as that of a JVM can include both a JIT compiler and an interpreter so that it may support multiple execution modes in which only selected parts of an application are complied, whereas the rest is interpreted. Such a strategy can be used, for example, to minimize total execution time because most execution time for an application is spent in only a small portion of the application's code. Time and space can be saved by interpreting, and not compiling, seldom-used code.

In a multiple execution mode environment, program execution can be initiated using the interpreter as the first execution mode, and a profiler, such as exemplary profiler 160 described above with reference to FIG. 2, can be utilized to identify those part of an application's code that are most critical for performance at runtime. For example, the profiler can associate a counter with each method entry and each loop of the application, and increment this counter every time the given method is called or the loop is re-iterated in the interpreter. When the profiler detects, for example, the program's frequently executed methods or parts which contain the most intensive loops, it can invoke the optimizing compiler for those selected methods or parts to run in the execution mode for higher performance.

By deferring compilation, exemplary dynamic compilation systems can access and exploit the profile information from the current execution of a program in other ways as well. For instance, upon detecting how a program is behaving, the profiler may select an already compiled method for speculative recompilation to further optimize dynamic behavior based on current assumptions and conditions, or the profiler may determine that a certain function call in a method should be replaced with a different function call whenever a condition holds and therefore recompile a method to change the code. The profiler may also wish to revert speculatively optimized code if newly acquired information about how a program is behaving invalidates prior optimization assumptions.

When recompilation is triggered in these types of situations, the virtual environment can perform dynamic loop transfer or on-stack replacement, which is a technique that allows a switch from interpretation mode to compiled code, or the swapping of one version of compiled code for another, in the middle of a method to dynamically replace a stack frame of the method in one form with another and continue execution from the corresponding entry point in the recompiled code. Dynamic loop transfer may also be triggered by an interpreter when, while interpreting a method, it discovers that the method has already been compiled (for example, by another thread or by the current thread at backwards branches), so that the compiled version can be run instead of the interpreter version.

Dynamic loop transfer involves essentially a four-step process. The runtime extracts the execution state (that is, the number of parameters/local variables, the current variable values, registers, operand stack, program counter, etc.) from the top stack frame of a suspended thread for a particular method. The compilation system then recompiles the method to generate new code. Next, the compiler generates a stack activation frame and updates it with the values extracted from the previous version. Finally, the system replaces the old activation frame with the new and transfers execution in the suspended thread to the new version at the point where control left the suspended thread. A technical obstacle presented by the process is the ability to feed the previous method's execution state in interpretation mode to its recompiled counterpart, potentially in a newly defined stack format for the new method, and then continuing to correctly execute the program in compiled mode.

Figure 5:
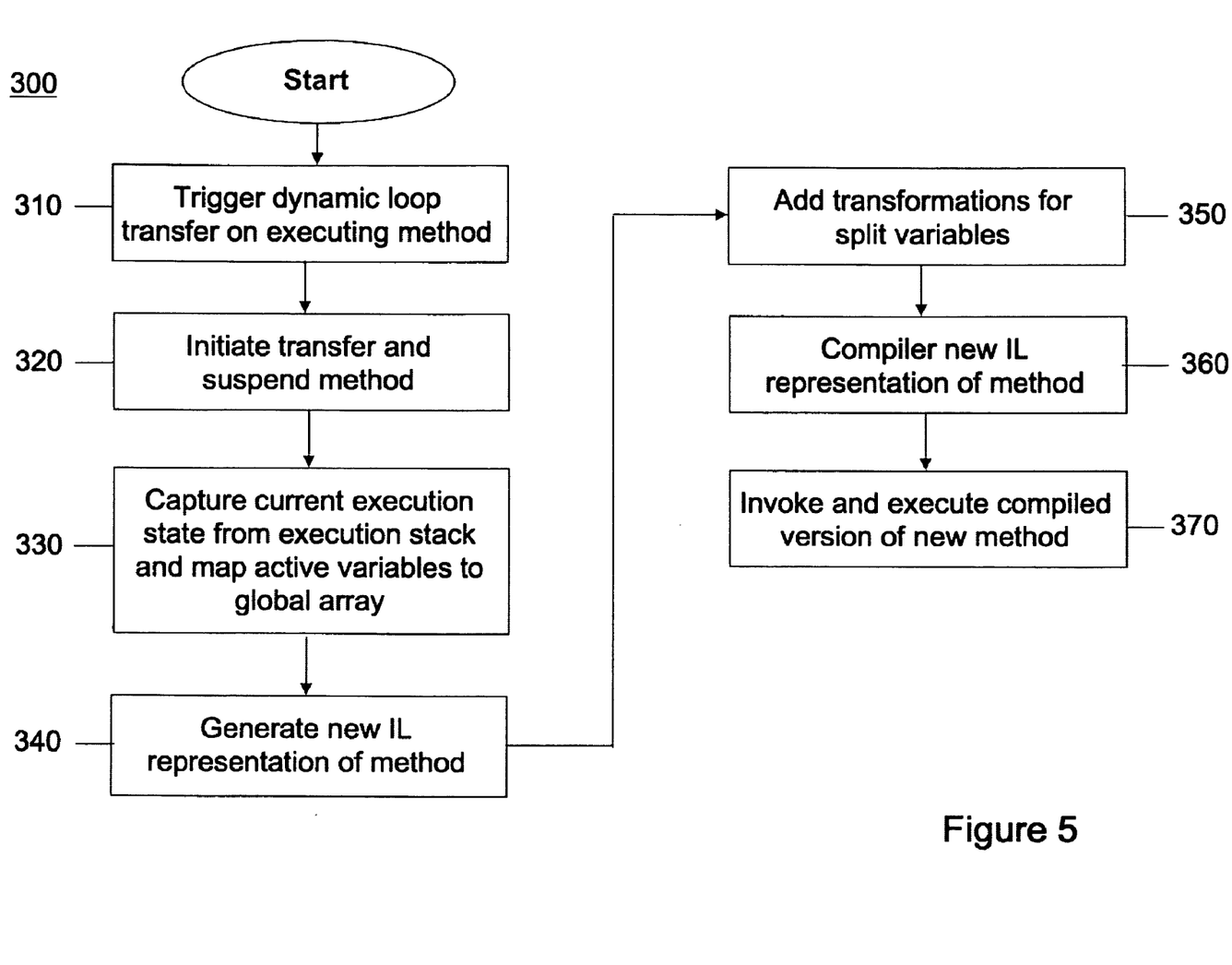
FIG. 5 is a flow diagram illustrating an exemplary embodiment of a dynamic loop transfer process in accordance with the present invention.

Referring now to FIG. 5, an exemplary embodiment of dynamic loop transfer process in accordance with the present invention is illustrated. In the present exemplary embodiment, process 300 is implemented within a dynamic compilation environment such as, for example, that of a JVM, that performs mixed mode execution of methods written in IL instructions such as, for example, Java bytecode by employing an interpreter and a dynamic compiler such as, for example, a JIT compiler.

At step 310, the replacement process is triggered for a method that is currently being interpreted. In exemplary embodiments, the process can be triggered when the interpreter encounters a particular point in the method that is known statically, for instance, by instructions that have been added inline with the code. In other exemplary embodiments, the process can be triggered by a profiler in response to profile information or by an interpreter, for instance, upon discovering that a particular transfer point of the method has already been compiled. The logic for determining when a transfer is to be triggered can take any suitable form and can be implemented, for example, to maximize performance benefits. For example, this logic can be provided within the structure of the dynamic compiler structure.

The process then proceeds to step 320, at which a transfer is initiated and execution of the method is suspended. The execution point in the method at which the transfer is initiated is identified as the entry point at which execution should resume in new method version. In the present exemplary embodiment, for ease of implementation, the transfer should be initiated at an execution point in interpreter execution mode at which the execution stack in interpreter mode is able to capture the complete execution state of the method in the current stack frame (for example, when there are no active subroutines in the execution stack). In other words, there should be no other active invocations of the method to ensure that there are no temporary execution states that need to be mapped back into compiled code.

Because much of program execution time is spent in program loops, a non-limiting example of an efficient point the method at which to initiate transfer is at the boundary of a loop backedge, which is a frequently encountered execution point at which the execution stack is able to capture the complete state of the method. Of course, in exemplary embodiments, the execution point at which the transfer is initiated can be at any other program execution points at which the execution stack is able to fully capture the method's current execution state.

At step 330, after transfer is initiated, the current execution state of the method being interpreted is captured from the execution stack frame for the interpreter. The execution state, which is a mapping that provides information about runtime values at the IL-level so that the method can be recompiled and execution restarted with another version, includes the thread running the activation, the current values for all active IL-level global, local, and stack variables, the current program counter, and a reference to the method's current stack frame.

In the present exemplary embodiment, the current values for the active variables are mapped to a global array in the execution state mapping. Suppose, for example, that the interpreter had been interpreting exemplary method "test", provided in pseudo-source code form in FIG. 6*a*, when the process was initiated at step 310. For this example and each of the exemplary pseudo-source code methods provided in the examples that follow, it should be noted that, in exemplary embodiments and typically in practice, the process can be performed on lower-level bytecode and/or intermediate representations generated from bytecode rather than source code versions of the methods.

Figure 6A:
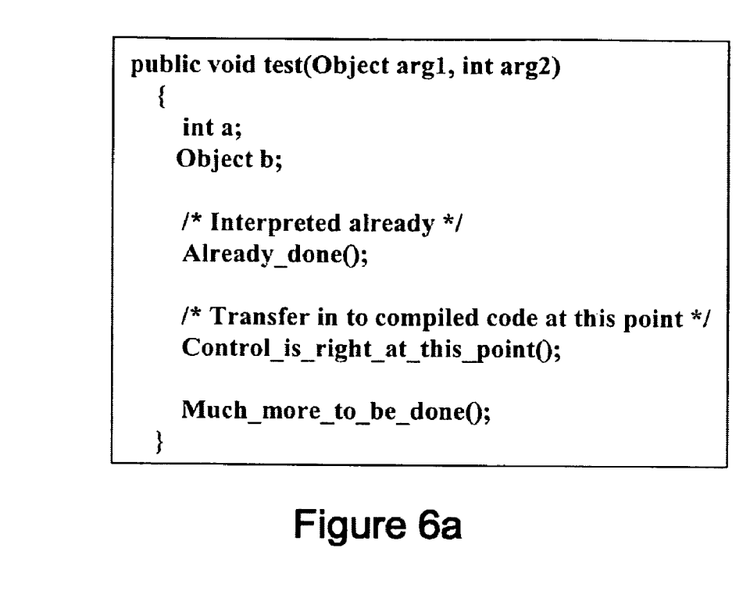
FIG. 6a illustrates an exemplary pseudo-source code method.

As indicated by the comment sections of exemplary method "test" in FIG. 6*a*, for this invocation of "test", the interpreter has already proceeded in execution beyond function "Already_done", and the transfer was initiated before invocation of function "Control_is_right_at_this_point". When the current execution state of the method "test" is captured from the execution stack frame, the current values of variables 'arg1', 'arg2', 'a', and 'b' in the stack frame are copied to global array 'glb_array[ ]' as follows:
  glb_array[0]=arg1
  glb_array[1]=arg2
  glb_array[2]=a
  glb_array[3]=b.

At step 340, the new method version is generated in an IL representation. The new representation is coded so that the values for the variables are reassigned from the global array after the initial variable declarations are performed in the method. A branch statement is then inserted after the reassignment code, and the target address of the branch statement corresponds to the point at which execution was suspended in the method and should resume in new method version after the variables are reassigned. The compensating code provided in the IL representation stage at this step in the exemplary embodiment should operate to steer the control into loops so as to keep the method's control-flow graph well-formed and enable better optimization.

Figure 6B:
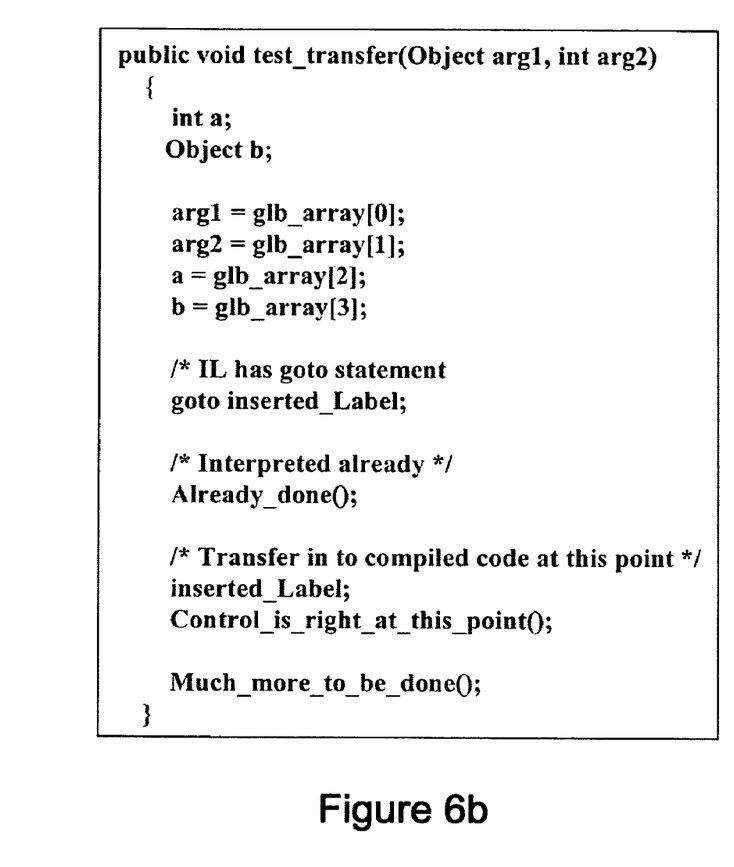

For example, a new method version of the exemplary pseudo-source code method "test" provided in FIG. 6*a* could be the exemplary method "test_transfer" provided in FIG. 6*b*. The new IL representation is coded so that the values for variables 'arg1', 'arg2', 'a', and 'b' are reassigned from the global array. The new representation also includes a 'goto' statement that is inserted to be performed after the variables are reassigned to cause execution of the method to branch to "inserted_Label", which corresponds to the entry point at which execution should resume in new method version.

Because the execution stack for the compiled code can assume a different stack variable mapping scheme for the method than that of the execution stack in interpreter mode, a variable mapping issue can arise at this point in the process. This results from the fact that a variable mapping slot on the stack frame of the execution stack that is reallocated for multiple variables during interpretation of the method is not necessarily reallocated in this fashion on the stack frame during execution of the compiled code. In interpreter mode, slots are only allocated on the current stack frame for the values of variables that are known within the active subroutine, and slots for variables only known in the active subroutine are not retained after it returns. Therefore, two or more variables having disjointed ranges in the IL representation of the method may share the same slot in the interpreter mode stack frame, and therefore also in the mapping to the global array, while appearing to the compiler as two different variables with different data types.

Figure 7A:
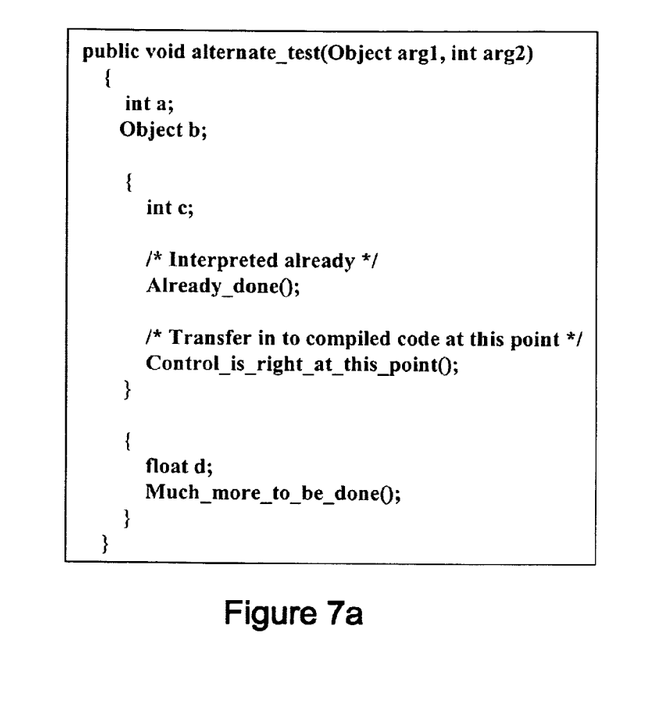
FIG. 7a illustrates a second exemplary pseudo-source code method.

For example, this issue of split variables arises with the exemplary pseudo-source code method "alternate_test" provided in FIG. 7*a*. When "alternate_test" is being executed by the interpreter, variables 'c' and 'd' of this method will typically share the same stack slot because they have disjointed live ranges. That is, the stack frame of execution stack in interpreter mode will have allocated five variable slots, rather than six, and the copy to 'glb_array[ ]' would be as follows:
  glb_array[0]=arg1
  glb_array[1]=arg2
  glb_array[2]=a
  glb_array[3]=b
  glb_array[4]=shared by c and d.

In practice, variables 'c' and 'd' may appear to the JIT compiler as two different variables with different data types (integer and floating point, respectively). To map the variable values of the global array into the new compiled code, a determination must be made of whether to copy the value stored at 'glb_array[4]' to 'c' or to 'd'. In this example, as indicated by transfer entry point, the value that should be mapped back at this point is that of variable 'c'. Variable 'd' will not be initialized with a new value until it is first referenced at a later point in execution.

As outlined above, the mapping of the current variable values to the global array when the state of the interpreted method is captured needs to take into account how variables are known on the execution stack for the compiled code. This can therefore require that a determination be made during generation of the new IL representation of which of the multiple variables recognized by the compiler should correctly receive the value of a shared variable slot on the execution stack in interpreter mode when the variable values stored in the global array are mapped back. The IL generation stage, however, can provide little useful information for determining which, if any, of two or more variables are actually in use without performing data flow analysis.

In the present exemplary embodiment, to resolve this issue without significantly complicating the compilation process, a simple transformation is added to the IL representation at step 350 for each instance of split variables. The original declarations of the split variables are deleted from the code, and the IL code is generated so that the split variables are declared according to their corresponding data type at the method body scope. Finally, the new IL representation is coded such that when the values for variables are reassigned from the global array, the value held in a shared variable slot on the execution stack in interpreter mode is reassigned to each of the split variables at the method body scope.

The ability to determine the appropriate data types for declaration of the split variables can be easily provided because, with the new IL representation being generated from the method's bytecode or prior set of IL instructions directly, a quick scan of these instructions is already performed as part of IL generation for the new method version. This scanning operation can be utilized to identify the data types (for example, integer, floating point, Object, etc.) that each shared interpreter mode stack slot will correspond to at the declaration points of each of the split variables throughout the method. This identification of the data types can be used to insert code into the new IL representation that declares a variable using the correct data type for each of the split variables at the method body scope.

Figure 7B:
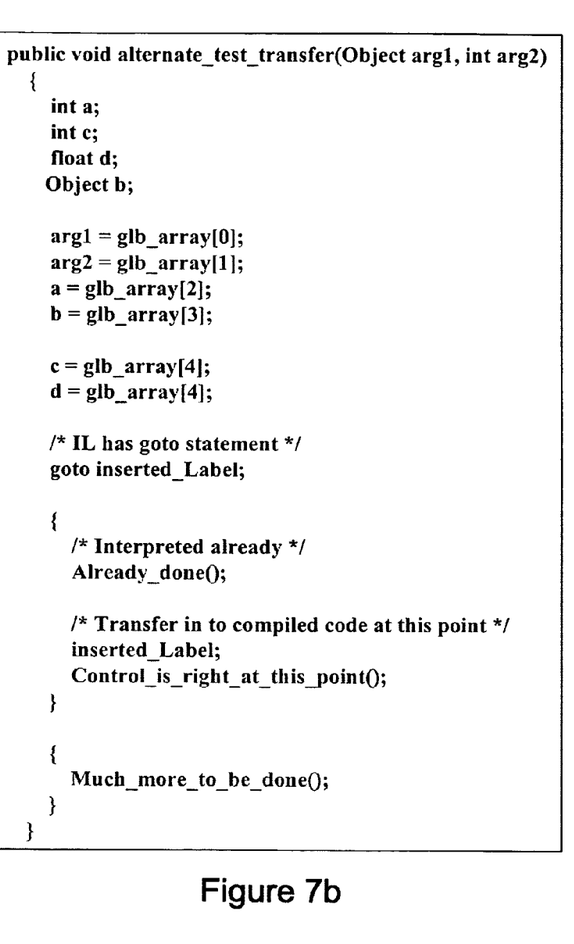

To illustrate an example of such a transformation, a new method version generated for the exemplary method "alternate_test" of FIG. 7a could be the exemplary pseudo-source code method "alternate_test_transfer" provided in FIG. 7b. The new IL representation is coded such that the prior declarations of variables 'c' and 'd' are removed, variable 'c' is declared as an integer and variable 'd' is declared as a floating point variable at the outset of "alternate_test_transfer", the values for variables 'arg1', 'arg2', 'a', and 'b' are reassigned from the global array, and the value held in shared interpreter stack slot glb_array[4] is mapped to both variable 'c' and variable 'd'. The new representation is also coded with a 'goto' statement that is inserted to cause execution of the method to return to the entry point corresponding to the point at which execution was suspended in the method and at which execution should resume in new method version after the variables are reassigned. In this example, the optimizer can be configured to perform a dead-code elimination optimization that will likely remove the "d=glb_array[4]" statement before code generation because variable 'd' will be initialized with a new value before it is ever referenced in a proper program.

In the present exemplary embodiment, the new IL representation of the method generated at steps 340 and 350 will be well-formed such that the full set of optimizations that would be done by the compiler in a statically compiled language (for example, code hoisting, common subexpression elimination, loop unrolling, range check elimination, dead-code elimination, inlining, escape analysis, data flow analysis, etc.), as well as a variety of feedback-directed optimizations that are not practical in a statically compiled language, can be performed on the method, resulting in better code quality and performance.

The transformation performed at this step can significantly simplify the process for initiating compilation for a dynamic loop transfer without requiring the data flow information to be known. While it may increase overall stack space consumption, the optimizer can decrease stack frame size by eliminating dead variables.

The approach to IL generation in the present exemplary embodiment also provides the additional flexibility of being able to dynamically generate an alternate IL representation of the new method body providing for normal entry (that is, without including the branch instructions inserted at step 340) that can be transferred in for a new invocation of the method. The method bodies providing for dynamic transfer entry and normal entry can be compiled into different method bodies, and the dynamic transfer entry body will only be used for threads that are at the entry point specified when the transfer was initiated. Using distinct compiled method bodies for the both normal entry and a dynamic transfer entry to the method provides the ability to extend this process by generating additional code bodies for different transfer points within the same method, thereby avoiding the possibility of having some threads being forced to execute in the interpreter because a dynamic transfer was already performed using a different transfer point, which is a limitation of the Sovereign approach.

After any needed transformations are performed at step 350, the process proceeds to step 360, at which the new IL representation of the method is compiled. The continuation of control flow from interpreter mode to compiled code can be performed in a manner that is semantically robust and clean. Because the new IL representation generated at steps 340 and 350 reflects the method's execution state within interpreter mode at the time the transfer was initiated, the logical operations of the compiler can be performed in the normal fashion to generate code to build the new stack frame for the current execution state in the execution stack for the compiled code using the reference to the interpreter mode stack frame captured in the current execution state. The compiler can therefore execute the compiled form of the method without having to account for the split variables (other than simply compiling of the transformation code added at step 350). In the present exemplary embodiment, because compilation for dynamic loop transfer is an independent compilation from normal compilation, it is performed separately so as not to interfere with the normal operation in the dynamic compilation environment.

Finally, at step 370, the new method is invoked and executed as if it were a normally compiled method. Because compensating code was generated within the IL representation for performing the transformation as described above, the original programming entities referenced by the stack frame pointer in the current execution state can be assigned to the stack frame of the execution stack for the compiled code such that execution of the compiled code will appear as though it began from the method start and reached the current execution state.

During the initial execution of the method, the variable values of the global array will be mapped to the variables of the new compiled method. The split variables are populated from the same shared slots of the interpreter mode stack according to their data types. As described above, sufficient information is provided by the bytecode scan performed during the generation of the IL representation at step 340 to populate the split variables according to data types without requiring data flow analysis to be performed. Execution of the method will then reach the dynamic branch instruction to the target address of the dynamic entry point that corresponds to the point at which the dynamic loop transfer was initiated to appear as though execution had flowed from the old method body and continued at the identified entry point in the new method.

In exemplary embodiments, control can be transferred in from the interpreter in a manner specific to the dynamic compilation environment for functions such as stack frame tearing down, state saving/restoring, and garbage collection suppression for the transition period (for example, "glb_array[ ]" could be made not known to the garbage collection mechanism). Using the approach of the present exemplary embodiment, execution of the final code of the new IL representation can be proven to be logically equivalent to execution of the original method version within the interpreter. The final code is also semantically robust and can be implemented cleanly (using fewer lines of code and no special casing in the optimizer) such that it can provide a benefit in terms of anticipated service workload.

The capabilities of exemplary embodiments of present invention described above can be implemented in software, firmware, hardware, or some combination thereof, and may be realized in a centralized fashion in one computer system or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. Exemplary embodiments of the present invention can also be embedded in a computer program product, which comprises features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Therefore, one or more aspects of exemplary embodiments of the present invention can be included in an article of manufacture (for example, one or more computer program products) having, for instance, computer usable media. The media has embodied therein, for instance, computer readable program code means for providing and facilitating the capabilities of the present invention. The article of manufacture can be included as a part of a computer system or sold separately. Furthermore, at least one program storage device readable by a machine, tangibly embodying at least one program of instructions executable by the machine to perform the capabilities of the exemplary embodiments of the present invention described above can be provided.

For instance, exemplary embodiments of the present invention can be implemented within the exemplary embodiment of a hardware configuration provided for a computer system in FIG. 1. The above-described program or modules implementing exemplary embodiments of the present invention can work on processor 12 and the like to perform dynamic loop transfer. The program or modules implementing exemplary embodiments may be stored in an external storage medium. In addition to system disk 27, an optical recording medium such as a DVD and a PD, a magneto-optical recording medium such as a MD, a tape medium, a semiconductor memory such as an IC card, and the like may be used as the storage medium. Moreover, the program may be provided to computer system 10 through the network by using, as the recording medium, a storage device such as a hard disk or a RAM, which is provided in a server system connected to a dedicated communication network or the Internet.

Although exemplary embodiments of the present invention have been described in detail, it should be understood that various changes, substitutions and alternations can be made therein without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the present invention.

While exemplary embodiments of the present invention have been described, it will be understood that those skilled in the art, both now and in the future, may make various modifications without departing from the spirit and the scope of the present invention as set forth in the following claims. These following claims should be construed to maintain the proper protection for the present invention.

What is claimed is:

1. A method for providing dynamic loop transfer within a dynamic compilation environment for a method having a first set of instructions being executed by an interpreter, the method having an execution stack including slots for storing a value of each local variable known to each subroutine of the method while the subroutine is active during execution by the interpreter, the method comprising:
suspending execution of the method by the interpreter at a point for which a current execution state of the method can be captured from the execution stack;
assigning the value in each slot of the execution stack in the current execution state to a corresponding slot of an array of values;
scanning the first set of instructions to identify a data type for each local variable of the method that is not known in the current execution state and shares a slot in the execution stack with a local variable that is known; and
generating a second set of instructions for the method, the second set of instructions being coded to be initially executed to declare each local variable that is known in the current execution state and each local variable for which a data type was identified while scanning the first set of instructions, assign each declared variable with the value assigned to the slot in the array of values that corresponds to the slot of the execution stack in which the value of the variable is stored during execution of the first set of instructions by the interpreter, and branch to a target point in the second set of instructions that corresponds to the point in the first set of instructions at which execution was suspended.

2. The method of claim 1, further comprising compiling the second set of instructions for the method using a dynamic compiler within the dynamic compilation environment.

3. The method of claim 2, further comprising replacing the execution stack with a new execution stack having a format recognizable by the dynamic compiler.

4. The method of claim 3, further comprising executing the second set of instructions.

5. The method of claim 2, further comprising performing a series of optimizations to the second set of instructions.

6. The method of claim 2, wherein the dynamic compiler is a just-in-time compiler.

7. The method of claim 1, wherein the dynamic compilation environment is that of a Java Virtual Machine.

8. The method of claim 7, wherein the first and second set of instructions are written in an intermediate language representation of Java bytecode.

9. The method of claim 1, wherein execution of the method by the interpreter is suspended at a boundary of a loop backedge.

10. A computer-usable medium having computer readable instructions stored thereon for execution by a processor to perform a method for providing dynamic loop transfer within a dynamic compilation environment for a method having a first set of instructions being executed by an interpreter, the method having an the execution stack including slots for storing a value of each local variable known to each subroutine of the method while the subroutine is active during execution by the interpreter, the method comprising:

suspending execution of the method by the interpreter at a point for which a current execution state of the method can be captured from the execution stack;

assigning the value in each slot of the execution stack in the current execution state to a corresponding slot of an array of values;

scanning the first set of instructions to identify a data type for each local variable of the method that is not known in the current execution state and shares a slot in the execution stack with a local variable that is known; and     generating a second set of instructions for the method, the second set of instructions being coded to be initially executed to declare each local variable that is known in the current execution state and each local variable for which a data type was identified while scanning the first set of instructions, assign each declared variable with the value assigned to the slot in the array of values that corresponds to the slot of the execution stack in which the value of the variable is stored during execution of the first set of instructions by the interpreter, and branch to a target point in the second set of instructions that corresponds to the point in the first set of instructions at which execution was suspended.

11. A data processing system comprising:

a central processing unit;

a random access memory for storing data and programs for execution by the central processing unit;

a first storage level comprising a nonvolatile storage device; and computer readable instructions stored in the random access memory for execution by central processing unit to perform a method for providing dynamic loop transfer within a dynamic compilation environment for a method having a first set of instructions being executed by an interpreter, the method having an the execution stack including slots for storing a value of each local variable known to each subroutine of the method while the subroutine is active during execution by the interpreter, the method comprising:

suspending execution of the method by the interpreter at a point for which a current execution state of the method can be captured from the execution stack;

assigning the value in each slot of the execution stack in the current execution state to a corresponding slot of an array of values;

scanning the first set of instructions to identify a data type for each local variable of the method that is not known in the current execution state and shares a slot in the execution stack with a local variable that is known; and generating a second set of instructions for the method, the second set of instructions being coded to be initially executed to declare each local variable that is known in the current execution state and each local variable for which a data type was identified while scanning the first set of instructions, assign each declared variable with the value assigned to the slot in the array of values that corresponds to the slot of the execution stack in which the value of the variable is stored during execution of the first set of instructions by the interpreter, and branch to a target point in the second set of instructions that corresponds to the point in the first set of instructions at which execution was suspended.

\* \* \* \* \*